United States Patent [19]

Rootham et al.

[11] Patent Number: 5,841,826
[45] Date of Patent: Nov. 24, 1998

[54] METHOD OF USING A CHEMICAL SOLUTION TO DISLODGE AND DISLOCATE SCALE, SLUDGE AND OTHER DEPOSITS FROM NUCLEAR STEAM GENERATORS

[75] Inventors: Michael W. Rootham, Pittsburgh, Pa.; Mark J. Parvin, Pittsford, N.Y.

[73] Assignee: Westinghouse Electric Corporation, Pittsburgh, Pa.

[21] Appl. No.: 805,004

[22] Filed: Feb. 25, 1997

Related U.S. Application Data

[63] Continuation-in-part of Ser. No. 521,059, Aug. 29, 1995, Pat. No. 5,764,717.
[51] Int. Cl.⁶ .............................. B08B 3/08; F22B 37/48
[52] U.S. Cl. .............................. 376/316; 134/1; 122/382; 210/206
[58] Field of Search .............................. 376/308–310, 376/316; 252/390, 392, 394; 166/244.1, 310–312, 371; 165/95; 122/379, 382, 392; 134/1, 10, 17, 21.11, 21.12; 422/14.16; 210/206

[56] References Cited

U.S. PATENT DOCUMENTS

| | | | |
|---|---|---|---|
| 3,684,720 | 8/1972 | Richardson | 252/86 |
| 4,040,962 | 8/1977 | Hanford | 210/206 |
| 4,079,701 | 3/1978 | Hickman et al. | 122/382 |
| 4,273,076 | 6/1981 | Lahoda et al. | 122/382 |
| 4,276,856 | 7/1981 | Dent et al. | 122/382 |
| 4,526,135 | 7/1985 | Calhoun et al. | 122/382 |
| 4,562,042 | 12/1985 | Moran | 422/13 |
| 4,576,123 | 3/1986 | Lahoda et al. | 122/382 |
| 4,632,705 | 12/1986 | Baum | 134/3 |
| 4,676,201 | 6/1987 | Lahoda et al. | 122/392 |
| 4,699,665 | 10/1987 | Scharton et al. | 134/1 |
| 4,899,697 | 2/1990 | Franklin et al. | 122/379 |
| 4,921,662 | 5/1990 | Franklin et al. | 376/316 |
| 4,972,805 | 11/1990 | Weems | 122/383 |

(List continued on next page.)

FOREIGN PATENT DOCUMENTS

58-131104  8/1983  Japan .

*Primary Examiner*—Charles T. Jordan
*Assistant Examiner*—M. J. Lattig

[57] ABSTRACT

A method for dislodging and dislocating scale, sludge, corrosion and other deposits from heat transfer equipment surfaces, such as boiler and heat exchanger surfaces in steam generation systems, which are in contact with aqueous systems. This invention relates to the introduction of an aqueous chemical cleaning solution into the heat exchanger vessel. The aqueous chemical cleaning solution contains a non-corrosive carrier agent and/or a non-corrosive intercalation agent. The carrier agent has the ability to penetrate the matrix of the sludge, scale and other deposits, and the intercalation agent causes the sludge, scale and other deposits to fracture and break apart. This invention relates to generating a series of pressure pulses within the non-corrosive aqueous chemical cleaning solution to create shock waves for dislodging, dissolving and fluidizing sludge and corrosion products. This invention relates to the soaking of scale, sludge and other deposits in aqueous chemical cleaning solutions to dislodge and dislocate the sludge, scale and other deposits. This invention further relates to an operation utilizing a high velocity jet of water, the water containing a chemical cleaning additive, to dislodge and dislocate scale, sludge, corrosion and other deposits from the interior surfaces of heat exchanger vessels, in particular, the interior of the secondary side of nuclear steam generators. The aqueous chemical cleaning solution utilized in the aforementioned soaking operation and the chemical cleaning additive contained in the aforementioned jet of water, may be a chelate agent or a non-corrosive chemical cleaning agent containing a carrier and/or intercalation agent. The non-corrosive chemical cleaning agent may be a lower alkyl amine, e.g., dimethylamine, lower hydroxyalkyl amine, e.g., ethanolamine and pentanolamine, or cyclic dimines, e.g., 1,10-phenanthroline, 2,9-dimethyl-1,10-phenanthroline, 2,2'-bipyrindine and 4,4'-bypyridine, or combinations thereof.

50 Claims, 5 Drawing Sheets

U.S. PATENT DOCUMENTS

| | | | |
|---|---|---|---|
| 5,006,304 | 4/1991 | Franklin et al. | 376/316 |
| 5,019,329 | 5/1991 | Franklin et al. | 376/316 |
| 5,069,172 | 12/1991 | Shirley et al. | 122/382 |
| 5,092,280 | 3/1992 | Franklin et al. | 122/379 |
| 5,092,355 | 3/1992 | Cadwell et al. | 134/1 |
| 5,154,197 | 10/1992 | Auld et al. | 134/1 |
| 5,183,573 | 2/1993 | Kreh et al. | 210/697 |
| 5,190,656 | 3/1993 | Paul et al. | 210/643 |
| 5,194,223 | 3/1993 | Moulton et al. | 422/16 |
| 5,200,105 | 4/1993 | Cuisia | 252/180 |
| 5,242,599 | 9/1993 | Chen et al. | 210/697 |
| 5,288,410 | 2/1994 | Cuisia | 210/699 |
| 5,322,635 | 6/1994 | Hieatt et al. | 252/82 |
| 5,360,550 | 11/1994 | Clubley et al. | 210/699 |
| 5,368,775 | 11/1994 | Rossi et al. | 252/392 |
| 5,409,614 | 4/1995 | Gallup et al. | 210/700 |
| 5,575,863 | 11/1996 | Sala et al. | 134/2 |
| 5,587,025 | 12/1996 | Jevec et al. | 148/274 |

METHOD OF USING A CHEMICAL SOLUTION TO DISLODGE AND DISLOCATE SCALE, SLUDGE AND OTHER DEPOSITS FROM NUCLEAR STEAM GENERATORS

This application is a Continuation in Part (CIP) of patent application Ser. No. 08/521,059 filed Aug. 29, 1995, now U.S. Pat. No. 5,764,717.

BACKGROUND OF THE INVENTION

1. Field of the Invention

This invention generally relates to a method for dislodging and dislocating scale, sludge, corrosion and other deposits from heat transfer equipment surfaces, such as boiler and heat exchanger surfaces in steam generation systems, which are in contact with aqueous systems. This invention relates to the introduction of an aqueous chemical cleaning solution into the heat exchanger vessel. The aqueous chemical cleaning solution contains a non-corrosive carrier agent and/or a non-corrosive intercalation agent. This invention relates to generating a series of pressure pulses within the non-corrosive aqueous chemical cleaning solution to create shock waves for dislodging sludge and corrosion products. This invention relates to the soaking of scale, sludge and other deposits in aqueous chemical cleaning solutions to dislodge and dislocate the sludge, scale and other deposits. This invention further relates to an operation utilizing a high velocity jet of water, the water containing a chemical cleaning additive, to dislodge and dislocate scale, sludge, corrosion and other deposits from the interior surfaces of heat exchanger vessels, in particular, the interior of the secondary side of nuclear steam generators. The aqueous chemical cleaning solution utilized in the aforementioned soaking operation and the chemical cleaning additive contained in the aforementioned jet of water, may be a chelate agent or a non-corrosive cleaning agent containing a carrier and/or intercalation agent. This invention is particularly useful during nuclear steam generator cleaning operations including chemical cleaning, pressure pulse cleaning, sludge lancing, upper bundle hydraulic cleaning (UBHC) and bundle flush followed by inert gas sparging.

2. Background of the Invention

Both pressure pulse and chemical methods for cleaning the interior of heat exchanger vessels such as the secondary sides of nuclear steam generators are known in the prior art. U.S. Pat. Nos. 4,899,697 (Franklin, et al.), 4,921,662 (Franklin, et al.), 5,006,304 Franklin, et al.), 5,092,280 (Franklin, et al.), and 5,092,355 (Cadwell, et al.) all disclose pressure pulse cleaning methods and devices to loosen and remove sludge and debris from heat exchanger surfaces within the secondary side of nuclear steam generators by means of shock waves introduced in water. U.S. Pat. No. 5,019,329 (Franklin, et al.) discloses an improved cleaning method for the secondary side of nuclear steam generators by means of vertically flushing the secondary side of nuclear steam generators during pressure pulse or other shock wave type cleaning operations.

U.S. Pat. No. 5,154,197 (Auld, et al.) discloses a chemically assisted pressure pulse cleaning method for removing sludge and corrosion products from the interior of heat exchanger vessels in the secondary side of nuclear steam generators. Auld teaches the introduction of pressure pulses within a liquid chelate-containing cleaning agent. In an embodiment of Auld, ethylenediamine tetraacetic acid (EDTA) is identified as the chelate agent.

Sludge lancing methods for cleaning the interior of heat exchanger vessels such as the secondary sides of nuclear steam generators with a high velocity jet of water are also known in the prior art. U.S. Pat. No. Nos. 4,079,701 (Hickman, et al.), 4,276,856 (Dent, et al.), and 4,273,076 (Lahoda, et al.) all disclose sludge lancing methods and devices to loosen and remove sludge and debris from heat exchanger surfaces within the secondary side of nuclear steam generators by means of a high velocity jet of water. U.S. Pat. No. 5,069,172 (Shirey, et al.) discloses an improved sludge lancing method for the secondary side of nuclear steam generators which incorporates a reciprocable suction device for removing dislodged particles of scale, sludge, and other deposits.

U.S. Pat. No. 5,154,197 (Auld, et al.) teaches the use of sludge lancing with a high velocity jet of water prior to the introduction of a liquid chelate-containing cleaning agent into the heat exchanger vessel, and the generation of pressure pulses within the cleaning agent.

The use of a non-chelate-containing chemical agent is known in the prior art for the purpose of corrosion control. U.S. Pat. No. Nos. 5,194,223 (Moulton et al.) and 5,368,775 (Rossi et al.) disclose methods for inhibiting and controlling corrosion by the addition of non-chelate-containing chemical agents to feedwater and condensate systems, respectively.

However, before the purpose and operation of such aforementioned cleaning methods may be understood, some basic understanding of the structure and maintenance problems associated with nuclear steam generators is necessary.

Nuclear steam generators generally comprise a bowl-shaped primary side through which hot, radioactive water from the reactor core is circulated, a secondary side disposed on top of the primary side into which non-radioactive water is fed, and a tubesheet which includes a number of U-shaped heat exchanger tubes disposed between the primary and secondary sides of the generator for thermally connecting but hydraulically insulating the primary and secondary sides so that heat from the radioactively contaminated water in the primary side will be conducted to the non-radioactive water in the secondary side, thereby causing it to boil and to create non-radioactive steam for electrical power generation.

The U-shaped heat exchanger tubes are contained within the secondary side of such nuclear steam generators. Each such heat exchanger tube is inverted, with its open ends mounted in the tubesheet and its legs and bent portion extending into the secondary side. A plurality of vertically spaced apart support plates are provided in the secondary side for laterally supporting the legs of each heat exchanger tube. The legs of the U-shaped heat exchanger tubes extend through bores present in these support plates. Small, annular spaces are present between these heat exchanger tubes and the bores in the support plates and tubesheet through which these tubes extend. These annular spaces are known in the art as "crevice regions." Such crevice regions provide only a very limited flow path for the feed water that circulates throughout the secondary side of the steam generator. The consequent reduced flow of water through these regions results in a phenomenon known as "dry boiling" wherein the feed water is apt to boil so rapidly in these crevice regions that they can actually dry out for brief periods of time before they are again immersed in the surrounding feed water. This chronic drying-out causes impurities dissolved in the water to plate or precipitate out and collect in these crevice regions. These precipitates ultimately create scale, sludge, corrosion and other debris on the exterior surfaces of the heat exchanger tubes, and the resulting corrosion can, over time, accumulate where they can obstruct the flow of feed water in the secondary side of the steam generator as well as the heat transfer rate to an extent where the steam output of the generator is seriously compromised. Moreover, the presence of scale and sludge and other debris is known to promote stress corrosion cracking in crevice region of the heat exchanger tubes and also in the free span region of the heat exchanger tubes which, if not arrested, will ultimately allow water from the primary side of the steam generator to radioactively contaminate the water in the secondary side of the generator. Thus, it is extremely important that maintenance operations are employed which prevent such scale, sludge and corrosion deposits from causing heat transfer losses and radioactive contamination of the feed water.

Chemical cleaning methods were developed in the prior art to dissolve such scale and sludge accumulation, and to ameliorate corrosion. In one of these methods, the nuclear steam generator is first taken out of service and completely drained of water from both the primary and secondary sides. Next, as most of the corrosion products contained within the crevice region and tube scales are iron oxide and copper that have become tightly ensconced in the crevice regions or on the surfaces of the heat exchanger tubes, chelate-containing iron and copper removal solvents are sequentially introduced into the interior side of the steam generator to dissolve and remove the impurities. Such iron removal solvents typically include an aqueous mixture of ethylenediamine tetraacetic acid (EDTA), hydrazine, ammonium hydroxide, and an inhibitor for retarding corrosion reactions between the metal surfaces in the generator and EDTA The copper solvent likewise includes an aqueous mixture of EDTA, ammonium hydroxide, and further includes hydrogen peroxide and ethylene diamine (EDA). The prior art chemical cleaning method of aforementioned U.S. Pat. No. 5,154,197 (Auld, et al.) discloses the introduction of at least one chelate-containing iron solvent bath followed by at least one iron solvent rinse, which is in turn followed by at least one chelate-containing copper solvent bath and at least one copper solvent rinse. The iron and copper solvents both contain EDTA as the chelate agent. The iron and copper rinses are applied to remove all residual traces of the chelate-containing iron and copper solvents.

While such copper and iron solvents have proven to be effective in removing iron oxide and copper deposits from the interior of the secondary side of such generators, they are also capable of promoting new corrosion within the steam generator despite the use of an inhibitor, particularly among the carbon steel and low alloy steel components of the generator. To minimize these corrosive effects, the iron and copper solvents are typically provided with low concentrations of their active chelate ingredients. However, the use of low concentrations protracts the time it takes for these cleaning agents to work, and often necessitates exposing the interior of the secondary side to multiple solvent baths along with multiple rinse cycles.

Non-chelate-containing agents are disclosed by aforementioned U.S. Pat. Nos. 5,194,223 (Moulton et al.) and 5,368,775 (Rossi et al.) for use in a method to inhibit corrosion; however, neither Moulton nor Rossi teaches nor suggests any method to dislodge and loosen scale, sludge and other deposits from the interior surfaces of a heat exchanger vessel.

Another shortcoming associated with prior art chemical operations employed to loosen and dislodge scale, sludge, and other deposits, is the fact that such operations are not entirely effective in removing tightly ensconced iron oxide and copper impurities from all of the numerous crevice regions within the secondary side of the generator. Part of this ineffectiveness results from the fact that tightly packed impurities in small spaces do not give the chemical solvent a sufficient opportunity to penetrate and to come in contact with large areas of the surface of such impurities. It is believed that insoluble fractions of the scale, sludge and other deposits collect as residues at the surfaces of these tightly ensconced deposits during the cleaning operation and hinder the penetration of the chemical solution beyond the surface of the deposit, thereby stopping or at least significantly reducing the dissolution of the deposits in the crevice regions.

Pressure pulse cleaning methods were also developed in the prior art to mechanically loosen and remove such stubborn deposits of scale and sludge in such small spaces in the interior of the secondary side of the steam generator. In an embodiment of the pressure pulsing operation, the generator is shut down, taken off-line and drained. Next, enough demineralized water is introduced into the secondary side to completely submerge the tubesheet and bundle of heat exchanger tubes that are disposed within the secondary side. Pressurized pulses of inert gas are then continuously introduced into this demineralized water near the tubesheet of the steam generator as the generator is being filled. These pulses of gas create explosive shock waves in the demineralized water within the secondary side that impinge all the heat exchanger components submerged within the water and which tend to loosen, dislodge and even fluidize the sludge and deposits present on the heat exchanger tubes, the support plates, the tubesheet and in the crevice regions of the secondary side. The dislodged and fluidized sludge and deposits are removed from the demineralized water by recirculating them through a filter and optionally a deionizer during the pressure pulsing operation. Preferably, the pulses of the debris-removing shock waves are continuously introduced into the demineralized water not only during the recirculation step, but also during the time that the demineralized water is introduced into and drained from the secondary side.

Because the pressure pulsing operation induces no new, unwanted corrosion on metallic surfaces within the secondary side of the steam generator, it represents a substantial advance in the art, and is rapidly gaining acceptance in the nuclear power industry as an alternative to chemical methods. But, while pressure pulse cleaning is capable of removing a great deal of sludge and deposits present in many of the secondary sides of such steam generators, it is rarely effective in removing all of the tightly ensconced deposits that accumulate in the crevice regions of the generator.

Sludge lancing methods were also developed in the prior art to dislodge large accumulations of sludge, scale, or deposits in the interior of the secondary side of a steam generator. The sludge lancing operation uses a high velocity jet(s) of demineralized water to loosen and dislodge sludge, scale, or deposits which have accumulated within the interior of the steam generator. Sludge lancing is performed on the top of the tubesheet and support plate regions of the steam generator. The sludge lancing operation may be employed prior to performing a subsequent heat exchanger vessel cleaning operation, such as chemical or pressure pulse cleaning. The loosening of these large accumulations allows for a more effective and efficient reaction between the chemical cleaning agents used in a subsequent cleaning operation. The large accumulations, if not loosened and dislodged, would tend to insulate crevice regions from exposure to the penetrating and cleaning action of the chemical agents used in the subsequent chemical or pressure pulse cleaning operation. Further, with the large accumulations dislodged, the potency of the chemical agents used in the subsequent cleaning operation is not unnecessarily wasted on scale, sludge and deposits that can be relatively easily and quickly removed by sludge lancing. Sludge lancing may also be performed following completion of the chemical or pressure pulsing operation to dislodge deposits that have fallen out of solution onto the tubesheet.

Additionally, upper bundle hydraulic cleaning (UBHC) was also developed in the prior art to dislodge large accumulations of sludge, scale, or deposits in the upper bundle region of the secondary side of the steam generator. The UBHC operation uses a high velocity jet(s) of water to loosen and dislodge sludge, scale, and deposits which have accumulated within the upper bundle region of the steam generator, and flushes the sludge, scale, and deposits to a lower level in the steam generator. UBHC as developed in the prior art was intended to be a periodic maintenance tool for long-term care and life extension of the steam generators. The UBHC operation is employed to loosen and dislodge deposits that may cause blockage and loss of heat transfer within the upper bundle region of the steam generator. Further, UBHC loosens and dislodges contaminants that could potentially lead to corrosion of the steam generator internals. UBHC may be performed above and below the tube support plates in the steam generator. UBHC may be employed prior to performing a subsequent heat exchanger vessel cleaning operation, such as chemical cleaning or pressure pulse cleaning. Following UBHC, sludge lancing may also be employed to cleanup the debris that is loosened and dislodged from the tubesheet.

Efforts have been made to combine both chemical and pressure pulse cleaning methods in one operation as suggested in aforementioned U.S. Pat. No. 5,154,197 (Auld, et al.) by generating shock waves in a liquid chelate-containing cleaning solution. However, improved cleaning methods are still being sought to find more desirable chemical solutions which have enhanced activity and less corrosive tendencies.

Clearly, what is needed is an improved operation which maintains all of the advantages associated with known chemical and pressure pulse cleaning, sludge lancing and UBHC techniques, but which avoids the drawbacks and disadvantages associated with each. Ideally, such an operation would be faster and not generate the large volumes of liquid radioactive waste. It would further be desirable if the operation reduced the probability that the chemical agents would promote the occurrence of new corrosion within the steam generator.

SUMMARY OF THE INVENTION

It is an object of the invention to provide an improved method to loosen and dislodge scale, sludge, corrosion or other deposits and debris from the interior of a heat exchanger vessel, in particular the interior of the secondary side of a nuclear steam generator.

Generally speaking, the invention is an improved method for chemically dislodging scale, sludge, corrosion and other deposits from the interior of a heat exchanger vessel such as the interior of the secondary side of a nuclear steam generator that eliminates or at least ameliorates some of the shortcomings associated with the prior art. An embodiment of the invention comprises the steps of introducing an aqueous solution of a carrier agent and an intercalation agent into the interior of a heat exchanger vessel which may be the secondary side of a nuclear steam generator, to promote dislodging of the sludge, scale, and deposits within the interior of the secondary side, then removing the aqueous solution and the dislodged sludge, scale and deposits.

In a second embodiment of the invention, the method comprises the steps of introducing an aqueous chemical cleaning solution of a carrier agent and an intercalation agent into the interior of the heat exchanger vessel, generating a series of pressure pulses within the aqueous chemical cleaning solution of a carrier agent and an intercalation agent filled within the interior of the secondary side of the nuclear steam generator to create shock waves and displacement in the solution that dislodge the scale, sludge, and other deposits, and then removing the chemical cleaning agent and dislodged debris therefrom.

In another embodiment of the invention, the method generally comprises the introduction of an aqueous chemical cleaning solution into the high velocity jet of water for cleaning a heat exchanger.

In still another embodiment of the invention, an aqueous chemical cleaning solution is introduced into the interior of a heat exchanger vessel, the aqueous chemical cleaning solution is allowed to remain within the heat exchanger vessel for a sufficient period of time such that particles of the scale, sludge or deposits lose their integrity and become more easily dislodged or dislocated by a high velocity jet of water.

Further, in a method of the invention, new types of chemical cleaning agents and solutions having a carrier agent and/or an intercalation agent enhance the loosening and dislodging of sludge and deposits from the nuclear steam generator without the use of numerous cleaning and rinse cycles associated with conventional chelates and solvents, and without the accompanying new corrosion and waste disposal concerns associated with other prior art methods. Additionally, these new types of aqueous chemical cleaning solutions have a low temperature pH in the region that is passive towards ferritic materials, and therefore, substantially eliminate any secondary corrosive effects in the interior of the secondary side of the nuclear steam generator. Moreover, these aqueous chemical cleaning solutions used in a method of the invention are steam volatile and thus, will decompose during nuclear steam generator operations, thereby further obviating any concern for chemical cleaning agent "residues" inadvertently left after the completion of a cleaning operation.

In an embodiment of the invention, the aqueous chemical cleaning solution is formed from at least one of the group consisting of lower alkyl amines, having 1 to 10 carbon atoms, or 1 to 6 carbon atoms; lower alkanol amines, having 1 to 10 carbon atoms, or 1 to 6 carbon atoms; alkoxyalkyl amines, having 1 to 10 alkoxy and alkyl carbon atoms, or 1 to 6 alkoxy and alkyl carbon atoms; and cyclic imines, preferably cyclic dimines. In an embodiment of the invention, the aqueous chemical cleaning solution is formed from a combination of either a non-corrosive lower alkyl $C_1$–$C_6$ amine, a non-corrosive lower hydroxyalkyl $C_1$–$C_6$ amine, or a non-corrosive lower $C_1$–$C_6$alkoxy $C_{1'-C_6}$ alkyl (or "carrier agent") to promote penetration of the chemical solution and active agents therein into the crevice regions and particularly into the sludge and deposit matrices accumulated within the secondary side of the nuclear steam generator, and/or a non-corrosive cyclic dimine (or "intercalation agent") to promote intercalation or at least dislodging of the scale, sludge and other deposits for removal from within the nuclear steam generator. Use of these chemical cleaning agents further minimize the chance that the aqueous chemical cleaning solution will induce any unwanted corrosion within the interior of the steam generator. In an embodiment of the invention, the carrier agent is formed from at least one of the group of dimethylamine, ethylamine, 1,2-diaminoethane, diaminopropane, ethanolamine, 2-methyl-2-amino-1-propanol, 5-aminopentanol and 3-methoxypropylamine or the like. In an embodiment of the invention, the intercalation agent is formed from at least one of the group of 1,10-phenanthroline, 2,9-dimethyl-1,10-phenanthroline, 4,7-dimethyl-1,10-phenanthroline, 2,2'-bipyridine, 4,4'-bipyridine, and terpyridine. Further, in an embodiment of the invention, the concentration of chemical cleaning agent within the water component of the solution is maintained at less than about 0.5 weight percent. In other embodiments of the invention, the concentration of chemical cleaning agent within the water component of the solution is maintained at less than about 0.1 weight percent, or at a concentration between about 0.0001 and 0.01 weight percent, or other suitable concentrations to effectively remove the scale, sludge and other deposits.

BRIEF DESCRIPTION OF THE DRAWINGS

There are shown in the drawings certain exemplary embodiments of the invention. It should be understood that the invention is not limited to the embodiments disclosed as examples, and is capable of variation within the scope of the appended claims. In the drawings.

DETAILED DESCRIPTION OF THE PREFERRED EMBODIMENTS OF THE INVENTION

Figure 1:
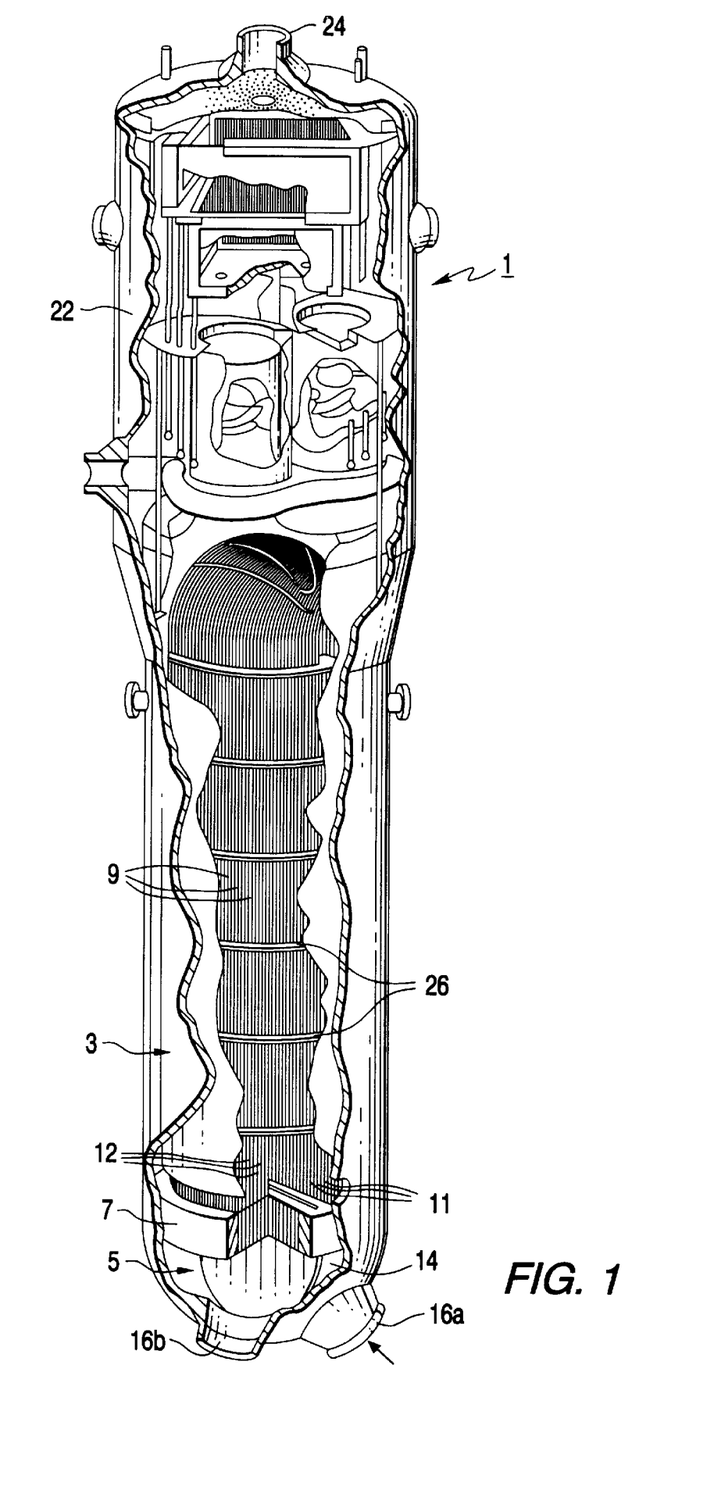
FIG. 1 is a cross-sectional view of a Westinghouse-type nuclear steam generator with the exterior walls cutaway in portions, showing the interiors of both the primary side and secondary side.
Figure 2:
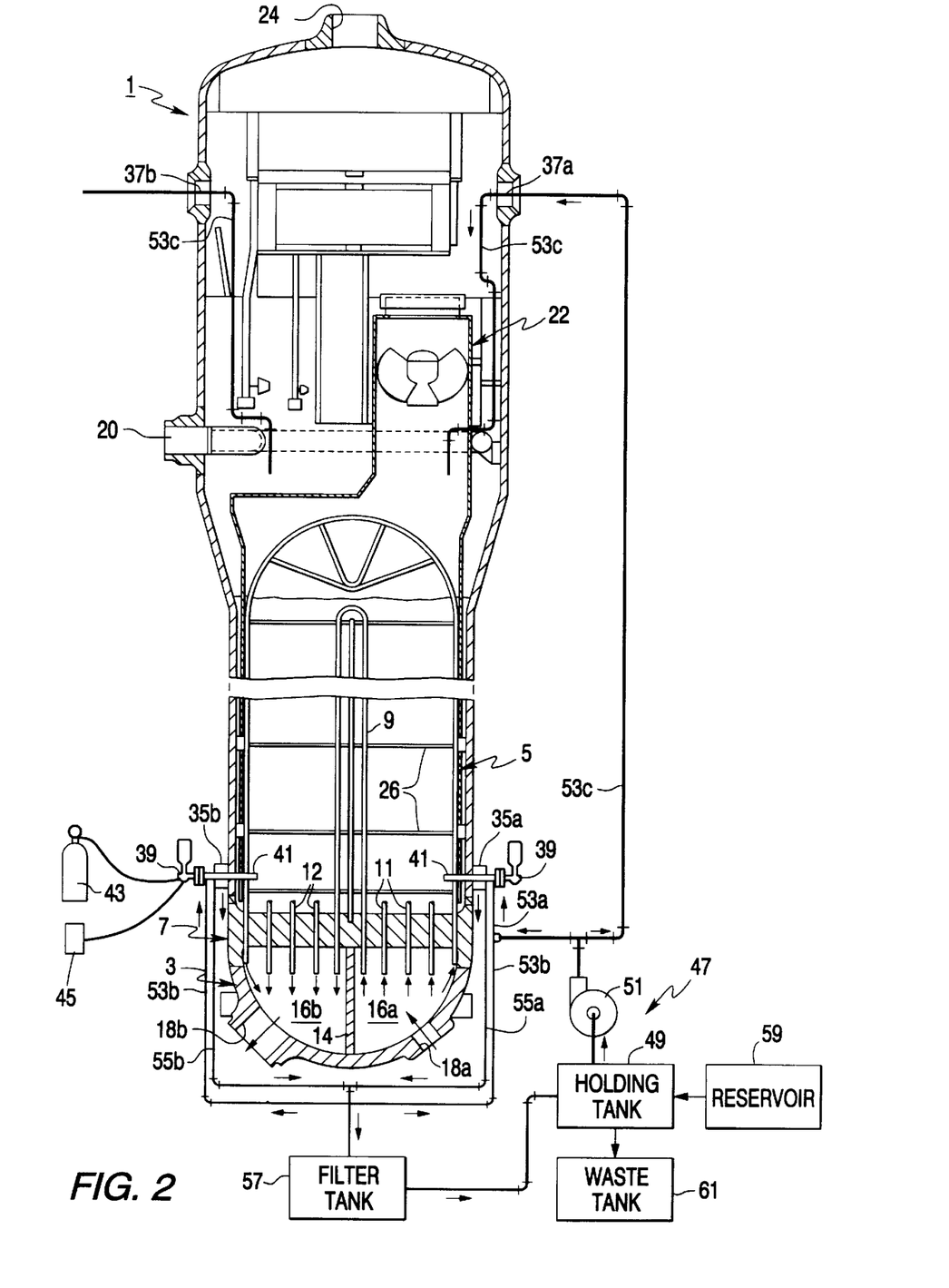
FIG. 2 is a generalized, cross-sectional view of a nuclear steam generator of the type illustrated in FIG. 1, showing the interiors of both the primary side and secondary side, and further including a schematic of the recirculation system used in one method of the invention.

With reference now to FIGS. 1 and 2, the method of the invention is useful in chemically loosening and dislodging sludge, scale, and other deposits that accumulate in heat exchanger vessels, particularly the interior of a nuclear steam generator (1). Such generators (1) include a bowl-shaped primary side (3) at their bottom portions, and a cylindrically-shaped secondary side (5) in their middle portions which are hydraulically separated by means of a tubesheet (7). Heat is conducted from the primary side (3) to the secondary side (5) through a number of heat exchanger tubes (9), each of which is shaped like an inverted U. Each tube (9) includes an inlet end (11) and an outlet end (12) which are mounted in bores in the tubesheet (7). A divider plate (14) divides the bowl-shaped primary side (3) into two quadri-spherical chambers known as channel heads (16a, 16b) in the art. The inlet ends (11) of all of the heat exchanger tubes (9) communicate with the right-hand channel head (16a), while the outlet ends (12) of all of these heat exchanger tubes (9) communicate with the left-hand channel head (16b). Manways (18a, 18b) afford access to the channel head (16a, 16b) respectively. In the secondary side (5), a feed water inlet (20) is provided for admitting non-radioactive and purified water over the bundle of U-shaped heat exchanger tubes (9) so as to immerse the same. Disposed above these tubes (9) is a steam drying assembly (22) which captures and returns water vapor entrained in the steam created by the generator (1) back into the feed water that immerses the heat exchanger tubes (9). An outlet port (24) at the top of the steam generator (1) conducts dry steam to the blades of a turbine (not shown) that is connected to an electrical generator (not shown). Finally, a number of vertically-spaced support plates (26) are disposed along the length of the secondary side (5) of the steam generator (1) for laterally supporting the legs of the U-shaped heat exchanger tubes (9). As is best seen in FIGS. 3a and 3b, each of these support plates (26) includes a plurality of bores (28) through which the heat exchanger tubes (9) extend.

In operation, hot, radioactive water from the reactor core (not shown) is admitted into the channel head (16a) and from thence flows upwardly into the inlet ends (11) of each of the heat exchanger tubes (9). This hot water flows upwardly through the inlet legs of each of the tubes (9) (known as "hot legs" in the art), continues flowing around the bend of each of the tubes (9), and from there flows down through the outlet legs (known as "cold legs" in the art) and from thence out through the outlet ends (12) of the heat exchanger tubes (9) and into the outlet channel head (16b), where it is ultimately recirculated back to the core of the reactor.

The hot, radioactive water from the primary side (3) transfers much of its heat through the walls of the heat exchanger tubes (9) and into the non-radioactive water that surrounds these tubes (9). This causes the non-radioactive water to boil and to create the steam which is ultimately conducted out of the outlet port (24) of the steam generator (1) for electrical power generation.

Figure 3A:
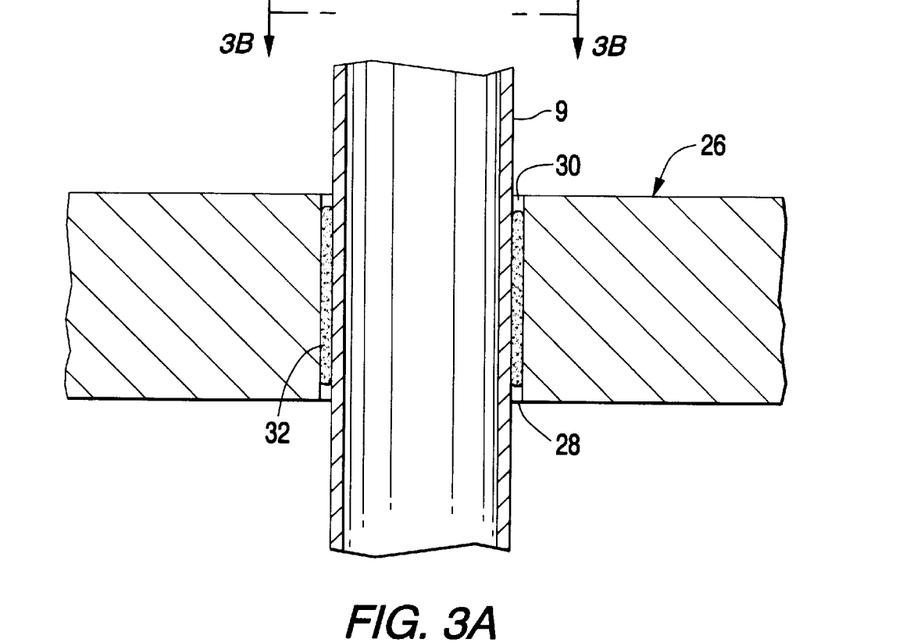
FIG. 3a is a cross-sectional side view of one of the heat exchanger tubes used in the nuclear steam generator illustrated in FIG. 2, showing how this tube extends through a bore in a support plate, and how scale, sludge, corrosion and other deposits accumulate in the annular space between the tube and the bore in the support plate.
Figure 3B:
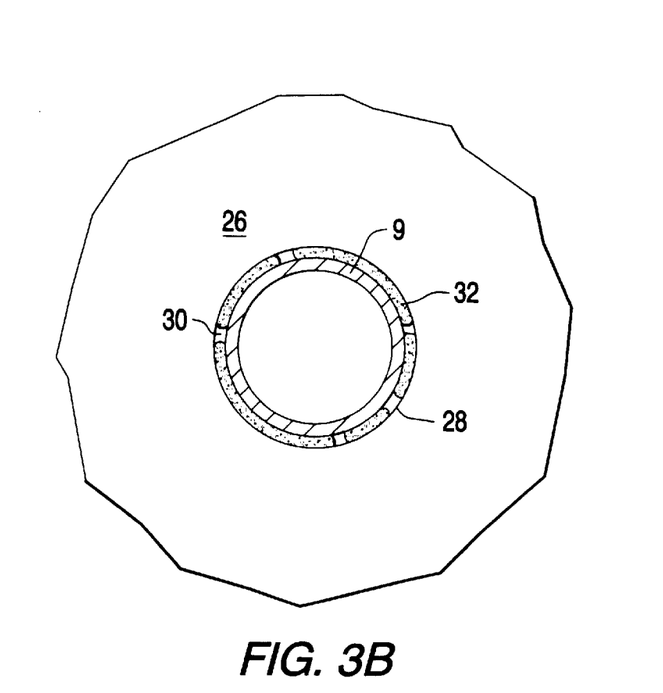
FIG. 3b is a plan view of the heat exchanger tube illustrated in FIG. 3 along line 3b—3b; and, FIG. 4 is a schematic diagram of the recirculation system used to implement the improved chemical cleaning method of the invention.

The manner in which scale, sludge, corrosion products and other deposits and debris accumulate in the crevice regions of the steam generator (1) is best understood with reference to FIGS. 3a and 3b. Between the heat exchanger tubes (9) and the bores (28) in the support plates (26) is a narrow, annular space (30). This annular space (30) provides a relatively constricted flow path for the non-radioactive water that is in a constant state of circulation around these tubes (9) during the operation of the steam generator (1). The resulting limited circulation can allow water to boil out of the space faster than the surrounding ambient water can re-envelope the heat exchanger tube (9). As a result of this "dry boiling," any impurities present in the water in the secondary side (5) are plated out or precipitated out onto the surfaces of this narrow annular space (30), forming deposits of scale, sludge, corrosion and other debris (32). As this sludge and debris (32) accumulates, recirculation through the annular space (30) is further retarded, which in turn accelerates the accumulation of even more sludge and debris (32) in this region. Ultimately, such sludge and debris (32) can completely fill the annular space (30). Furthermore, the scale, sludge and corrosion and other deposits are also accumulated in the free span region of the heat exchanger tubes (9) in the area between the support plates (26). Chemical analysis has shown that the primary components of the sludge and debris (32) include magnetite ($Fe_3O_4$), elemental copper, and copper oxide. Such sludge and debris accumulations can promote the occurrence of corrosion in the outer walls of the heat exchanger tubes (9) in the vicinity of the support plates (26), which in turn may cause these tubes (9) to crack, thereby contaminating the non-radioactive water of the secondary side (5) with the hot, radioactive water from the primary side (3) of the generator (1). The same destructive phenomenon can also occur in the annular spaces (not shown) between the bores and the tubesheet (7) and the outer walls of the heat exchanger tubes (9) that extend through these bores. One of the purposes of the chemical cleaning method of the invention is to remove such scale, sludge and debris (32) from crevice regions such as the annular space (30) along with the products of any corrosion which a sludge might have started. To this end, a method of the invention involves at least flushing and rinsing with a non-corrosive chemical cleaning solution, and may also include generating pressure pulses in such a non-corrosive chemical cleaning solution, in which the chemical cleaning solution includes an aqueous solution formed from at least one of the group consisting of lower alkyl amines, lower hydroxyalkyl amines and cyclic dimines introduced into the secondary side (5) of the steam generator (1) in order to loosen and dislodge such scale, sludge and debris (32).

FIG. 2 illustrates a mode of implementing the chemical cleaning method of the invention, wherein both pressure pulse generators and a chemical recirculation system are installed within the lower hand holds (35a, 35b) and upper manways (37) of the nuclear steam generator (1). More specifically, a pressure pulse generator (39) having a nozzle (41) for emitting a pressurized pulse of gas is detachably secured within each of the lower hand holds (35a, 35b). A source of pressurized gas (43), which may be a compressed bottle of nitrogen or air or other inert gas, is connected to each of the pressure pulse generators (39), as is a pulser control unit (45) which periodically actuates the pulser generator (39) to discharge a volume of compressed gas through the nozzle (41). In another method, each of the pressure pulse generators (39) is a Model PAR 600B air gun manufactured by Bolt Technology, Inc. located in Norwalk Conn., and the pulser control unit (45) is a Model FC 100 controller manufactured by the same corporate entity. Additionally, while the nozzles (41) are schematically illustrated as being horizontally-oriented, they may also be canted at a 30° angle with respect to the upper surface of the tubesheet (7) so as to minimize the momentary forces that the shock waves create by the pulses of gas applied to the heat exchanger tubes (9) nearest the open ends of the nozzle (41). In a method of the invention, the firing cylinder of each of the pressure pulse generators (39) contain between 75 and 100 cubic inches of pressurized gas.

Figure 4:
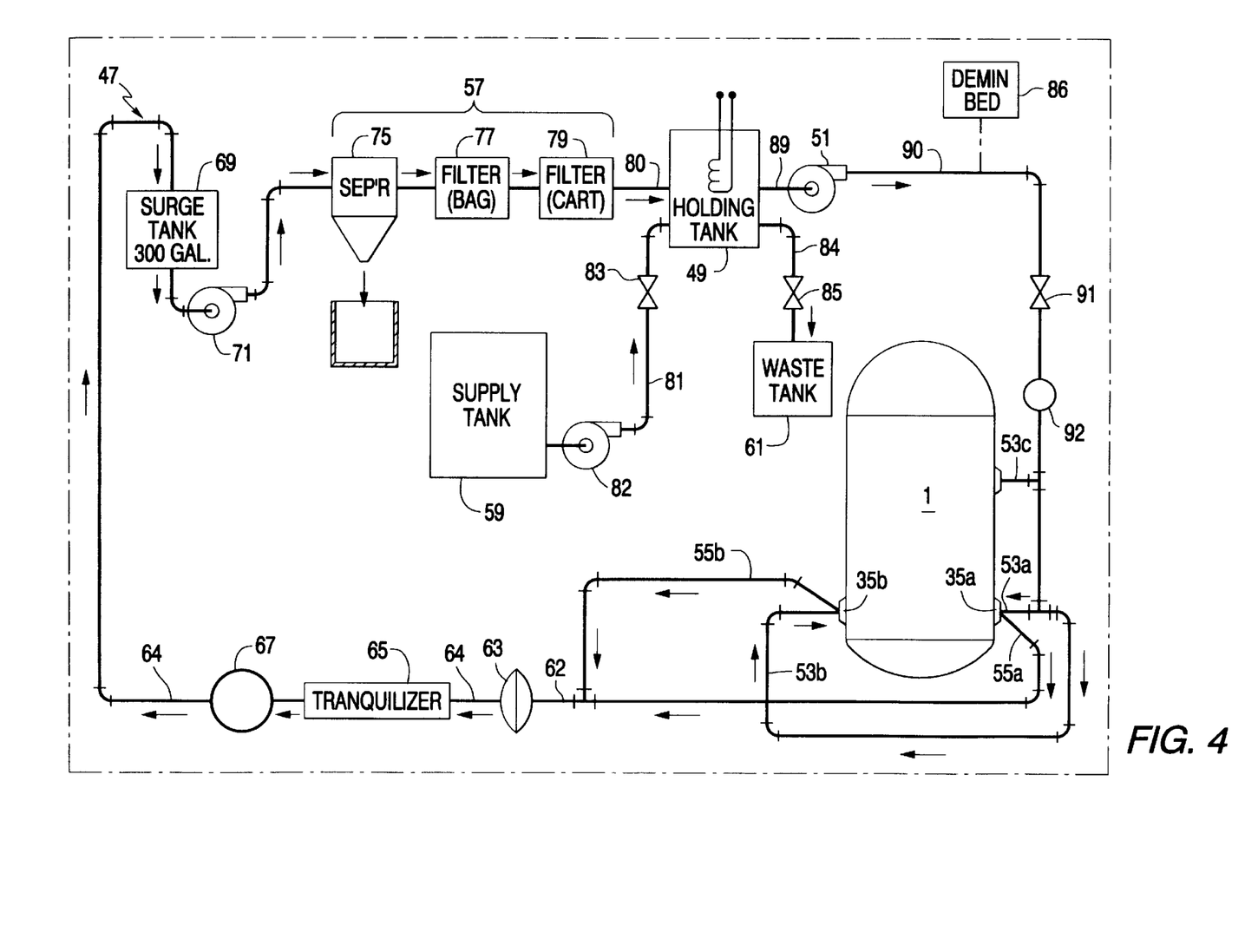

With reference to FIGS. 2 and 4, the recirculation system (47) that is used to implement an embodiment of the method of the invention generally comprises a holding tank (49) for holding and optionally heating the liquid chemical agents, if desired. Although, the liquid chemical cleaning agents of the invention effectively operate at ambient temperature, circulated through the secondary side (5) of the generator (1). A circulation pump (51) for creating the pressure differential necessary to circulate such chemical cleaning agents into and out of the secondary side (5), and three inlet conduits (53a, 53b, 53c) for introducing the liquid chemical agent through the hand holes (35a, 35b) and upper manways (37) of the secondary side (5). Further included are a pair of outlet conduits (55a, 55b) for removing liquid chemical agents from the interior of the secondary side (5), a filter bank (57) for removing undissolved scale, sludge and debris entrained in the liquid chemical cleaning solution removed from the secondary side (5), an aqueous solution (59) for supplying chemical agents to the holding tank (49), as well as optional rinsing and passivation agents, if desired although not required in the method, and a waste tank (61) for collecting previously used solutions from the holding tank (49). In addition, the recirculation system can optionally include ion exchange columns filled with ion exchange resins in a demineralizer bed (86) (shown in phantom), if desired, somewhere downstream of the filtration system to remove the dissolved ionic species from the aqueous solution prior to recirculation so that there will be no opportunity for such dissolved ionic species to re-enter the secondary side (5) of the generator and create new scale, sludge and deposits. However, such ion exchange clean-up of the recirculating solution may result in the generation of more waste to be disposed.

FIG. 4 illustrates the recirculation system (47) in more detail. Specifically, outlet conduits (55a, 55b) converge into a single inlet conduit (62) which in turn is connected to a diaphragm pump (63). The diaphragm-type pump (63) is used in a method of the invention at this point in the recirculation system (47) since the liquid chemical agent withdrawn through the outlet conduits (55a, 55b) may include large particles of suspended sludge and debris which, while easily handled by a diaphragm-type pump, could damage or even destroy a centrifugal or positive displacement pump. The outlet of the diaphragm (63) is connected to the inlet of a tranquilizer (65) by way of a conduit (64). The purpose of a tranquilizer (65) is to even out the pulsations in the liquid chemical agent created by the diaphragm pump (63) so that a flow meter (67) located downstream of the tranquilizer (65) can reliably indicate the rate of flow of liquid chemical agent through the conduit (64). Located downstream of flow meter (67) is a surge tank (69). The purpose of the surge tank (69) is to accumulate the flow of liquid chemical agent generated by the diaphragm pump (63) and to smoothly deliver it to the inlet of recirculation pump (71). The pump (71) in turn generates a sufficient pressure head in the recirculating chemical agents to drive it through the filter bank (57), which includes a cyclone separator (75), a bag filter (77), and a cartridge filter (79). When the liquid chemical agent enters the filter bank (57), a substantial portion of the scale, sludge and other debris suspended in the agent is centrifugally flung out of the agent as it flows through the cyclone separator (75). Located downstream of the cyclone separator (75) is the one to three micron bag filter (77) that is serially connected to the one micron cartridge filter (79). These filters (77,79) remove any small particulate matter which still might be suspended in the chemical agent after it passes through the cyclone separator (75).

A conduit (80) connects the filter bank (57) to the inlet of the previously mentioned holding tank (49). As a schematically illustrated FIG. 4, the holding tank (49) includes at least one heater coil for optionally heating the recirculating chemical agent to a desired temperature. As has been previously indicated, the holding tank (49) is connected to a chemical agent supply reservoir (59) by means of a conduit (81). A pump (82) is provided in the conduit (81) for generating the pressure differential necessary to transfer the contents of the reservoir (59) into the holding tank (49). A valve (83) is further provided in the conduit (81) for regulating the flow of fresh chemical cleaning agents or rinsing agents into the holding tank (49). The waste tank (61) is connected to the holding tank (49) by means of a conduit (84). If the level of liquid within the waste tank (61) can be made to be lower than the level of liquid in holding tank (49), no pump is necessary in the conduit (84) as the contents of the tank (49) can be made to drain into the tank (61). A valve (85) is provided in the conduit (84) to the control the rate of such draining. The purpose of the waste tank (61) is to remove spent chemical and other agents from the holding tank (49), and to temporarily "park" these agents until such time as they may be disposed of properly. Finally, the holding tank (49) communicates with the previously mentioned recirculation pump (51) by way of an outlet conduit (89). The outlet of a pump (51) is in turn connected to the outlet conduit (90) which communicates with the previously mentioned generator inlet conduits (53a, 53b, 53c) by way of another flow meter (92). While the supply (59) and holding (49) tanks are shown as each being a single tank, they may in fact comprise two or more tanks, respectively, that separately contain different chemical agents used in a method of the invention.

Depending upon the condition of the steam generator (1), sludge lancing and/or upper bundle hydraulic cleaning (UBHC) operations may be employed prior to and/or following the performance of a chemical or pressure pulse cleaning operation. If the deposits are several inches thick, sludge lancing may be used to remove loose deposits of sludge that have accumulated over the tube sheet (7) and support plates (26). UBHC may be performed to remove loose deposits of sludge that have accumulated in the upper bundle of the steam generator (1). Sludge lancing and UBHC techniques known in the prior art involve the use of a high velocity jet(s) of water to dislodge and flush out these accumulations. In an embodiment of the invention, sludge lancing and/or UBHC are performed utilizing a chemical cleaning additive in the high velocity jet(s) of water. The chemical cleaning additive may be selected from any group of chemical cleaning solutions (for example, but not limited to, ethylenediamine tetraacetic acid (EDTA), hydrazine, ammonium hydroxide, ethylene diamine (EDA), nitrilotriacetic acid, or hydrogen peroxide).

The chemical cleaning additive utilized during the sludge lancing or UBHC operations may also be a non-corrosive, aqueous chemical cleaning solution, containing chemical cleaning agents including a carrier agent and/or an intercalation agent. The carrier agent (i.e., short chain aliphatic amines) may include at least one compound from the group of lower alkyl amines, $C_1$–$C_6$ alkyl amines, lower alkanol amines, $C_1$–$C_6$ alkanol amines, and lower alkoxyalkyl amines, $C_1$–$C_6$ alkoxy $C_1$–$C_6$ alkyl amines, and combinations and derivatives thereof The intercalation agent may include at least one compound from the group of cyclic dimines. In an embodiment of the invention, the aqueous chemical cleaning solution contains at least one carrier agent and at least one intercalation agent. The concentration of the chemical cleaning agents within the aqueous chemical cleaning solution may be less than 0.5 weight percent, less than 0.1 weight percent, between about 0.0001 and 0.01 weight percent, or between about 0.0005 and 0.005 weight percent.

Examples of lower alkyl amines which are suitable for use as a carrier agent in the method of the invention include dimethylamine (DMA), ethylamine, 1,2-diaminoethane (DAE), and diaminopropane (DAP). Examples of lower alkanol amines which are suitable for use as a carrier agent in the method of the invention include ethanolamine, 2-methyl-2-amino-1-propanol (AMP), and 5-aminopentanol 5-AP). An example of a lower alkoxy alkyl amine which is suitable for use as a carrier agent in the method of the invention includes 3-methoxypropylamine (MPA). Other short chain amines which can be used as a carrier agent in the method of the invention will be apparent from the foregoing examples.

Examples of cyclic dimines which are suitable for use as an intercalation agent in the method of the invention include 1,10-phenanthroline, 2,9-dimethyl-1,10-phenanthroline, 4,7-dimethyl-1,10-phenanthroline, 2,2'-bipryidine, and 4,4'-bipridine, and terpyridine. Other cyclic imines which can be used as an intercalation agent in the method of the invention will be apparent from the foregoing examples.

While an aqueous chemical cleaning solution including one or more of the group of the aforementioned non-corrosive, carrier and intercalation agents may be used in the method of the invention, a mixture of at least one of the lower alkyl amines, or their hydroxy or alkoxy derivatives and/or at least one of the cyclic dimines may also be used in implementing the method of invention. While the theory of the enhanced loosening action of these compounds is not completely understood, it is believed that the aforementioned non-corrosive, highly water soluble, strongly basic lower alkyl amines, lower alkanol amines, and/or lower alkoxyalkyl amines (carrier agents) have small molecular size and high mobility; these characteristics allow the carrier agent to penetrate the deposit matrix of the sludge and debris on the heat exchanger surfaces, causing the sludge and debris to be loosened or dislodged. Moreover, it is further believed that these small molecules act as a carrier for the non-corrosive, strongly basic cyclic diimine (intercalation agent) larger molecules. The cyclic diimine molecules have the ability to disrupt crystal bond lengths in the scale, sludge and debris matrix by a process known as intercalation. The intercalation process consists of the insertion of a molecule into a crystal structure. The insertion of the molecule causes the bond lengths of the crystal structure to change. For example, in an embodiment of the invention, the cyclic diimine (intercalation agent) reacts with the silicate compound contained within the scale and sludge. The insertion of the cyclic diimine molecule into the silicate compound crystal structure causes the bond lengths of the silicate crystal to change. The change in bond lengths results in the breaking apart, and fracturing of the scale and sludge matrix; thereby dislodging and loosening the scale, sludge and debris from the heat exchanger surfaces into the aqueous chemical cleaning solution. Thus, when used in combination, the small molecules will penetrate the scale, sludge and deposit matrix and bring the larger molecules to the scale, sludge and deposit site where intercalation can be used to weaken the bonding of scale, sludge and deposits to the surfaces of the interior of the heat exchanger vessel. It is also believed that the intercalation agents disrupt the scale, sludge or deposits by "growing" bond lengths in some of the hydrothermal minerals present in the scale, sludge and deposits, which in turn causes the scale, sludge or deposits to loose integrity and become more easily dislodged and dislocated. Furthermore, the chemical cleaning agents advantageously have a low temperature pH in the region that is passive towards ferritic materials, and therefore, substantially eliminating any secondary corrosive effects in the interior of the secondary side of the nuclear steam generator. Moreover, these chemical cleaning agents used in the method of the invention are steam volatile and will decompose during nuclear steam generator operations, thereby further obviating any concern for chemical cleaning agent "residues" inadvertently left after the completion of the operation.

The chemical reaction of the carrier and intercalation agents can be distinguished from the chemical reaction of prior art chemical cleaning agents. The aforementioned U.S. Pat. No. 5,154,197 (Auld, et al.) teaches the use of chelate-containing cleaning solutions, such as iron and copper solvents containing EDTA. The chelate EDTA reacts with the metal oxides, such as iron and copper, within the scale and sludge. This reaction results in the dissolution of the metal oxides. The carrier and intercalation agents do not cause a dissolution reaction, but rather loosen and dislodge the scale and sludge. The chelate agent, EDTA, does not react with the silicate compound contained within the sludge and scale matrix, as does the chemical cleaning agent used in an embodiment of the present invention. These chelate-containing solvents are introduced into the vessel for periods of time until a sufficient amount of the sludge and deposits have dissolved into the iron and copper solvents. The solvents are then removed from the vessel; the solvents containing the dissolved iron and copper compounds. Unlike the carrier and intercalation agents of the present invention, chelates are corrosive to the materials of a nuclear steam generator.

In another embodiment of the invention, an aqueous chemical cleaning solution is introduced into the interior of the secondary side of the steam generator prior to sludge lancing and/or UPHC operations. The aqueous chemical cleaning solution is allowed to remain within the interior of the steam generator for a sufficient period of time such that particles of the scale, sludge and deposits lose their integrity or dissolve and become more easily dislodged or dislocated. The soak period typically consists of a time between about 8 and 24 hours. However, the soak period may be longer or shorter, consistent with plant schedule constraints for the cleaning operation. After the scale, sludge and deposits are allowed to soak in the aqueous chemical cleaning solution, the high velocity jet(s) of water, or water with a chemical cleaning additive, is utilized to remove the scale, sludge and deposits from the interior of the steam generator. This aqueous chemical cleaning solution may be selected from the same groups of chemical cleaning agents identified above for the chemical cleaning additive in the high velocity jet(s) of water, e.g., chelates, carrier agents and intercalation agents. The introduction of the aqueous chemical cleaning solution within the secondary side of the steam generator can occur while the steam generator is either on-line or off-line. For nuclear power plant operation, the aqueous chemical cleaning solution may be introduced into the nuclear steam generator by adding the aqueous chemical cleaning solution to the auxiliary feedwater flow following shutdown, during the cooldown period, after residual heat removal (RHR) has been initiated.

There are two advantages associated with the implementation of a sludge lancing and/or UBHC step at this juncture, i.e., prior to performing any other chemical or pressure pulse cleaning operations. First, such sludge lancing and/or UBHC methods expedite the entire operation of dislodging sludge, scale, and deposits in the interior of the steam generator, by quickly removing what might amount to up to three to four inches of sludge and debris that, while loosely deposited on the tube sheet (7), the upper bundle, and other areas of the generators (1), would tend to hydraulically insulate crevice regions such as the annular spaces (30) between the bores (28) and the support plates (26) and the heat exchanger tubes (9) from the penetrating and loosening action of any surrounding chemical agent. Secondly, with the performance of sludge lancing and/or UBHC operations prior to a subsequent chemical cleaning method, the potency of the active chemical cleaning compounds used in a subsequent chemical cleaning operation is not unnecessarily wasted on metals and metal compounds that can be relatively easily and quickly removed by mechanical loosening techniques. This in turn allows the chemical strength of these compounds to be concentrated at the crevice region interfaces in the tubesheet (7), at the support plate (26), and the upper bundle within the secondary side (5), where such strength is needed most, as well as in the free span region of the heat exchanger tubes (9).

Following the sludge lancing and/or UBHC operations, the steam generator is prepared for subsequent chemical or pressure pulse cleaning operations. If not already done, all of the water is drained out of both the primary side (3) and the secondary side (5). Mounting plates (not shown) which secure the nozzles (41) of the pressure pulse generators (39) within each of the lower hand holds (35a, 35b) are installed. Further installation involves the chemical cleaning agent outlet conduit (90) through the upper manways (37a, 37b) into position over the bundle of heat exchanger tubes (9).

One or more chemical cleaning agents is then introduced into the interior of the secondary side (5) of the steam generator from the holding tank (49), and fills the secondary side (5) with the aqueous chemical cleaning solution. In an embodiment of the invention, the aqueous chemical cleaning solution is a non-corrosive, aqueous solution; the composition of this aqueous chemical cleaning solution may be the same as the non-corrosive, aqueous chemical cleaning solution which has been previously identified for use as the chemical cleaning additive and aqueous chemical cleaning solution in the sludge lancing and UBHC methods of this invention, including a carrier agent and/or an intercalation agent.

The aqueous chemical cleaning solution is transferred from the supply reservoir tank (59) to the holding tank (49) via conduit (81) by opening valve (83) and actuating pump (82). The heater coil within the holding tank (49) can be actuated, if desired, to bring the temperature of the aqueous chemical cleaning solution to a desired value. Valve (91) is then opened, and recirculation pump (51) is actuated so that the aqueous chemical cleaning solution is conducted through the outlet conduit (90), through flow meter (92) and finally into inlet conduits (53a, 53b, 53c). As soon as a sufficient amount of aqueous chemical cleaning solution has accumulated within the secondary side (5) to completely submerge the nozzles (41), under approximately three feet of liquid, each of the pressure pulse generators (39), the pressure pulse generators are actuated to commence the introduction of pressurized pulses of nitrogen or other inert gas into the aqueous chemical cleaning solution in order to generate shock waves that effectively loosen and dislodge sludge and other debris from the metallic surfaces within the secondary side (5). The frequency of pressure pulses generated by the pressure pulse generators (39) take place at intervals of between ten and sixty seconds, and in one embodiment of the invention the frequency is one pulse every ten seconds.

Initially, the shock waves are introduced by pulses of gas pressurized to about 400 psi. As the level of the aqueous chemical cleaning solution rises, the discharge pressure used in the pressure pulse generators (39) is increased to about 900 psi when the level of the aqueous chemical cleaning solution within the secondary side (5) has reached its highest level, at which time it substantially submerges all but the bent portions of the U-shaped heat exchanger tubes (9). This proportionate increase in the pressure of gas pulses counteracts a tendency of the gradually increasing level of the hydrostatic pressure of the aqueous chemical cleaning solution at the bottom of the secondary side (5) to reduce the intensity of the shock generated by the pressure pulse generators (39).

The aqueous chemical cleaning solution is then allowed to circulate through the recirculation system (47) while at its maximum level within the secondary side (5) for a period of between about 12 and 24 hours or less. In total, the filling, circulation and draining of the aqueous chemical cleaning solution in the method of invention takes between 20 and 40 hours or less. All during this time, the pressure pulse generators (39) continue to discharge pulses of pressurized nitrogen or other inert gas in the aqueous chemical cleaning solution circulating within the secondary side (5) at a frequency of about once every ten seconds. The filling step may be implemented with a flow rate through the inlet conduit of as little as between about 25 and 100 gallons per minute, or a relatively fast flow rate of between about 75 and 500 gallons per minute can be used to shorten the total amount of time required for the method to be completed.

Finally, the aqueous chemical cleaning solution is drained from the secondary side (5) by accumulating it within the holding tank (51) and then discharging it into the waste tank (61) through conduit (84) and valve (85). All during this time, the pressure of the gas used in the pressure pulse generators (39) is lowered from 900 psi to about 400 psi until there is only approximately again three feet of aqueous chemical cleaning solution standing over the nozzles (41) over the pressure pulse generator (39).

In an embodiment of the invention, pressure pulsing is performed during the introduction, circulation, and removal of the aqueous chemical cleaning solution and other rinses in order to advantageously contract the time required for the loosening of the secondary side (5). It may be desirable to repeat the filling, circulation, and draining steps to effectuate enhanced cleaning. Furthermore, sludge lancing and/or UBHC techniques in accordance with the invention may again be performed at the completion of this cycle. The chemical cleaning additive that may be introduced into the high velocity jet(s) of water and the aqueous chemical cleaning solution used for soaking the scale, sludge and deposits, may be selected from prior art chemicals or the groups of non-corrosive carrier and intercalation agents previously described for the sludge lancing and UBHC operations of the invention.

Performing the sludge lancing and/or UBHC operations of the invention prior to and/or following other chemical cleaning or pressure pulsing operations, results in the substantial shortening of time to loosen, dislodge and fluidize the insoluble components of the scale, sludge and other debris, thereby giving the aqueous chemical cleaning solution of the chemical or pressure pulse cleaning operations continuous free access to the remaining sludge accumulations. This is a particularly important mechanism in the crevice regions such as those previously described between the annular spaces (30) between the heat exchanger tubes (9) and the boards (28) within the support plates (26), where the static retention of insoluble components of scale, sludge and other debris can retard if not stop altogether removal of the components of the scale, sludge and debris. A related mechanism which is further believed to accelerate the removal of the sludge and debris is the fact that the shock waves generated by the pressure pulse generator (39) during the pressure pulsing operation are capable of cracking or otherwise generating fissures in accumulations of scale, sludge and debris that are not initially dislodged and fluidized by these pulses. The generation of such cracks and fissures increases the amount of surface area within these accumulations that come into contact with the aqueous chemical cleaning solution thereby hastening its intercalation and/or fluidization. Other helpful mechanisms include the continuous circulation of the aqueous chemical cleaning solution within the secondary side (5) by the recirculation system (47), coupled with the continuous, localized agitation of the aqueous chemical cleaning solution by the pressure pulse generators (39). The agitation that results from these activities prevents any localized areas of depleted aqueous chemical cleaning solution from occurring in any of the areas of the secondary side (5) which promote poor circulation, such as the previously described crevice regions. Still another speed enhancing mechanism is the fact that the extreme agitation of the aqueous chemical cleaning solution afforded by the pressure pulse generators (39) helps to mechanically promote the removal of loosening to remove components within the scale, sludge and other debris. Further, a primary heat/pressure reduction process, as described in U.S. Pat. No. 4,632,705 issued to Baum, incorporated by reference herein, may be used to concentrate the cleaning chemicals in the crevice regions. Another embodiment of the invention uses a non-corrosive aqueous chemical cleaning solution to prevent increased accumulation of corrosion deposits. The aggregate effect of these advantageous mechanisms not only shortens the amount of time necessary to conduct the chemical cleaning bath, it further obviates the need for other cleaning baths/rinses which were typically required in the prior art to dislodge, loosen or dissolve sludge, scale, and/or other deposits.

After the aqueous chemical cleaning solution has been completely removed from both the secondary side (5) of the generator (1) and the holding tank (49), optional rinse and passivation steps, if desired although not required, with demineralized water, hydrazine and ammonia by methods known in the prior art can be accomplished. The rinse and passivation solutions may be admitted from separate supply tanks into the holding tank (49) and from thence into the interior of the secondary side (5), recirculated and removed from the secondary side (5). The purpose of the rinse is to remove any residual amounts of aqueous chemical cleaning solution which still may be present within the secondary side (5). The passivation agent is used to create a protective, thin oxide coating on all of the exposed metal surfaces within the secondary side (5) in order to retard the occurrence of future corrosion.

Figure 5:
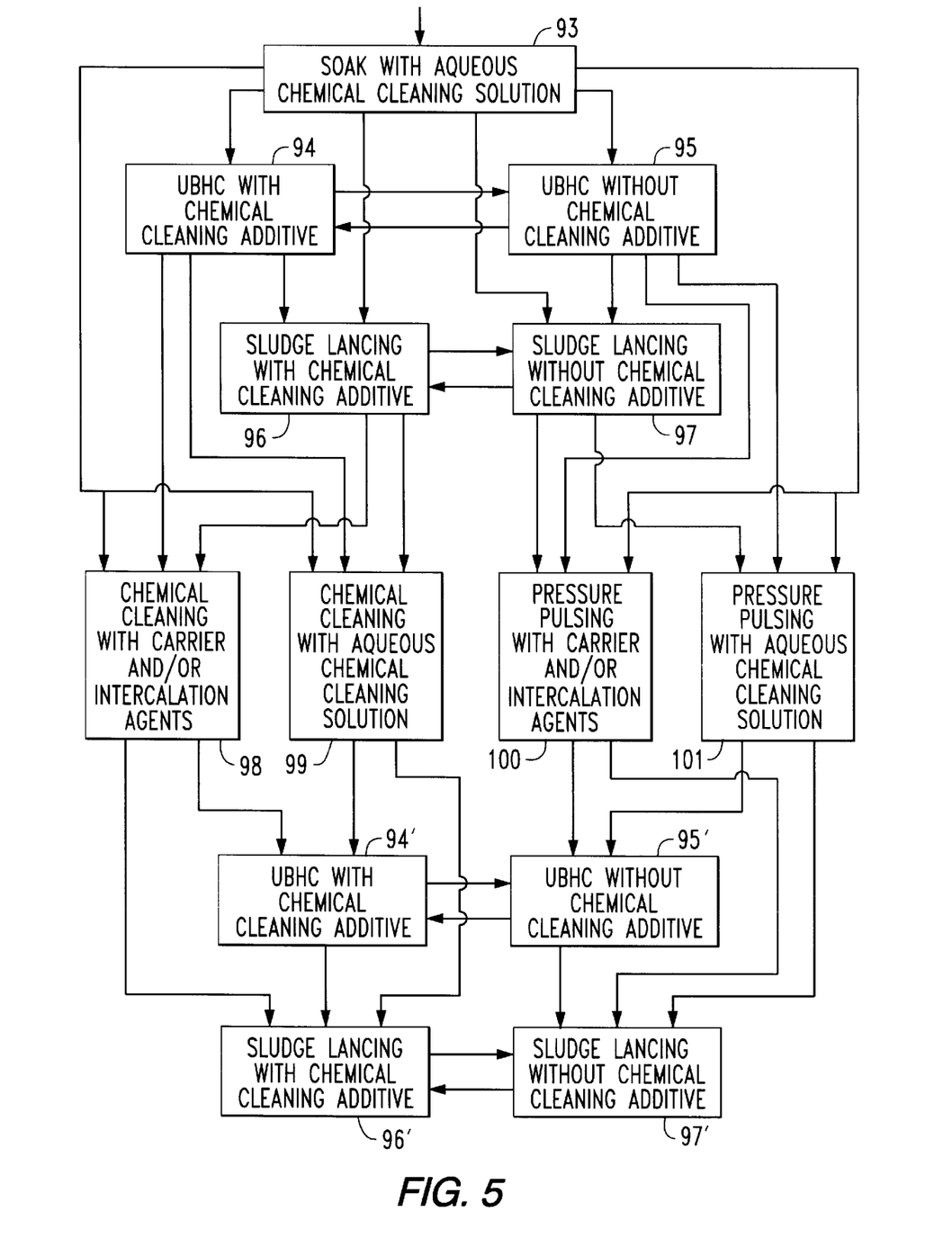
FIG. 5 is a flow diagram showing various combinations of chemical cleaning methods of the invention used to dislodge scale, sludge and other deposits from the interior surfaces of heat exchanger vessels.

FIG. 5 illustrates various combinations of chemical cleaning methods of the invention used to dislodge sludge, scale, and other deposits from the interior surface of a heat exchanger vessel. The method of the invention may include one of the following chemical cleaning methods: soak with an aqueous chemical cleaning solution (93); or UBHC with a chemical cleaning additive (94); or sludge lancing with a chemical cleaning additive (96); or chemical cleaning using a carrier agent and/or intercalation agent solution (98); or chemical cleaning using an aqueous chemical cleaning solution (99); or pressure pulse cleaning using a carrier agent and/or intercalation agent solution (100); or pressure pulse cleaning using an aqueous chemical cleaning solution; or combinations of these processes, which may include UBHC without a chemical cleaning additive (95) and/or sludge lancing without a chemical cleaning additive (97). Such combinations may include either a soak (93) or UBHC (94 or 95). The soak may be performed with either a chelate-containing aqueous chemical cleaning solution, or an aqueous chemical cleaning solution containing a non-corrosive carrier agent and/or a non-corrosive intercalation agent. The UBHC may be performed either with (94) or without (95)

the use of a chemical cleaning additive. The chemical cleaning additive may contain a chelate, or at least one from the group of a non-corrosive carrier agent and a non-corrosive intercalation agent. The UBHC operation (94 or 95) may be substituted with, or followed by, a sludge lancing operation (96 or 97). The sludge lancing may be performed either with (96) or without (97) a chemical cleaning additive. The chemical cleaning additive for sludge lancing may contain a chelate, or at least one from the group of a non-corrosive carrier agent and a non-corrosive intercalation agent. The method of the invention may be terminated following the soak (93), UBHC (94 or 95) or sludge lancing (96 or 97) steps.

However, another embodiment of the invention includes the implementation of a chemical cleaning operation with a non-corrosive carrier agent and/or an intercalation agent solution (98), or another aqueous chemical cleaning solution (99). The chemical cleaning operation may be performed subsequent to any of the following processes or combinations thereof: performing the soak (93), UBHC (with (94)or without (95) the chemical cleaning additive), and sludge lancing (with (96) or without (97) the chemical cleaning additive). UBHC (with (94') or without (95') the chemical cleaning additive) and/or sludge lancing (with (96') or without (97') the chemical cleaning additive) may also be performed following the chemical cleaning operation.

In another embodiment of the invention, pressure pulse cleaning may be performed with a non-corrosive carrier agent and/or an intercalation agent solution (100), or with another aqueous chemical cleaning solution (101) to dislodge and loosen sludge, scale, and other deposits from the interior surface of a heat exchanger vessel. As with the chemical cleaning operations (98 and 99), pressure pulsing (100 and 101) may be performed subsequent to any of the following processes or combinations thereof a soak with an aqueous chemical cleaning solution (93) (containing at least one from the group of a carrier agent and an intercalation agent), and/or UBHC (with (94) or without (95) a chemical cleaning additive), and/or sludge lancing (with (96) or without (97) a chemical cleaning additive). UBHC (with (94') or without (95') a chemical cleaning additive) and/or sludge lancing (with (96') or without (97') a chemical cleaning additive) may also be performed following the pressure pulse operation.

In an embodiment of the invention, the aforementioned aqueous chemical cleaning solution and chemical cleaning additive may be formed from a combination of either a non-corrosive lower alkyl $C_1$–$C_6$ amine, a non-corrosive lower hydroxyalkyl $C_1$–$C_6$ amine, or a non-corrosive lower $C_1$–$C_6$alkoxy$C_1$–$C_6$alkyl (or "carrier agent") to promote penetration of the chemical solution and active agents therein into the crevice regions and particularly into the sludge and deposit matrices accumulated within the secondary side of the nuclear steam generator, and/or a non-corrosive cyclic dimine (or "intercalation agent") to promote intercalation or at least dislodging of the scale, sludge and other deposits for removal from within the nuclear steam generator.

Reference can be made to U.S. Pat. Nos. 4,899,697; 4,921,662; 5,006,304; 5,019,329; 5,092,280; 5,092,355; and, 5,154,197 for a further detailed description of the nuclear steam generator structure and pressure pulse cleaning methods. Reference to U.S. Pat. Nos. 4,079,701; 4,276,856; 4,273,076; and 5,069,172 may be made for a further detailed description of sludge lancing methods and devices. Reference to U.S. Pat. Nos. 5,194,223 and 5,368,775 may be made for a further detailed description of prior art non-corrosive, non-chelate chemicals.

The U.S. patents cited in this invention disclosure are incorporated in their entireties by reference herein.

The invention having been disclosed in connection with the foregoing embodiments and examples, additional variations will now be apparent to persons skilled in the art. The invention is not intended to be limited to the embodiments specifically mentioned, and accordingly reference should be made to the appended claims rather than the foregoing discussion of preferred embodiments and examples, to assess the spirit and scope of the invention in which exclusive rights are claimed.

What is claimed is:

1. A method for removing sludge, scale, or deposits from an interior of a heat exchanger vessel, which comprises:
   introducing an aqueous chemical cleaning solution into said interior of said heat exchanger vessel, said aqueous chemical cleaning solution comprising a chemical cleaning agent consisting of a carrier agent and an intercalation agent; and,
   removing said aqueous chemical cleaning solution and at least a portion of said sludge, scale or deposits from said interior of said heat exchanger vessel.

2. The method of claim 1, wherein said carrier agent is selected from the group consisting of dimethylamine, ethylamine, 1,2-diaminoethane, diaminopropane, ethanolamine, 2-methyl-2-amino-1-propanol 5-aminopentanol and 3-methoxypropylamine.

3. The method of claim 1, wherein said intercalation agent is selected from the group consisting of 1,10-phenanthroline, 2,9-dimethyl-1,10-phenanthroline, 4,7-dimethyl-1,10-phenanthroline, 2,2'-bipyridine, 4,4'-bipyridine, and terpyridine.

4. The method of claim 1, wherein said chemical cleaning agent is provided in a concentration less than 0.1 weight percent of said aqueous chemical cleaning solution.

5. The method of claim 1, which further comprises:
   generating a series of pressurized pulses within said aqueous chemical cleaning solution after said aqueous chemical cleaning solution has been introduced into said interior of said heat exchanger vessel to create shock waves in said aqueous chemical cleaning solution.

6. The method of claim 1, in which said introducing and removing steps are repeated one or more times until removal of said sludge, scale, or deposits is substantially complete.

7. The method of claim 1, wherein said heat exchanger vessel is a nuclear steam generator.

8. A method for removing sludge, scale, or deposits from an interior of a secondary side of a nuclear steam generator, the method comprising the steps of:
   filling said interior of said secondary side with an aqueous chemical cleaning solution of a chemical cleaning agent, wherein said chemical cleaning agent is at least one of the group consisting of a carrier agent selected from the group consisting of dimethylamine, ethylamine, 1,2-diaminoethane, diaminopropane, ethanolamine, 2-methyl-2-amino-1-propanol, 5-aminopentanol, and 3-methoxypropylamine, and an intercalation agent selected from the group consisting of 1,10-phenanthroline, 2,9-dimethyl-1,10-phenanthroline, 4,7-dimethyl-1,10-phenanthroline, 2,2'-bipyridine, 4,4'-bipyridine, and terpyridine;
   recirculating said aqueous chemical cleaning solution within said secondary side while simultaneously introducing a succession of pressurized pulses of gas into said aqueous chemical cleaning solution to loosen said sludge, scale, or deposits from said secondary side;

filtering said aqueous chemical cleaning solution during said recirculating step to remove said sludge, scale, or deposits from said aqueous chemical cleaning solution; and, draining said aqueous chemical cleaning solution from said secondary side of said nuclear steam generator.

9. The method of claim 8, wherein a concentration of said chemical cleaning agent is less than about 0.1 weight percent of said aqueous chemical cleaning solution.

10. The method of claim 8, wherein a concentration of said chemical cleaning agent is between 0.0001 and 0.01 weight percent of said aqueous chemical cleaning solution.

11. The method of claim 8, wherein said pressurized pulses of said gas are continuously introduced into said aqueous chemical cleaning solution during said filling and draining steps.

12. The method of claim 8, wherein said aqueous chemical cleaning solution is formed from said at least one carrier agent to promote penetration of said aqueous chemical cleaning solution into crevice regions within said secondary side and said at least one intercalation agent to promote intercalation, dislocation or fluidization of said sludge, scale, or deposits.

13. A method for performing a chemical cleaning operation utilizing a high velocity jet of water to loosen or dislodge scale, sludge or deposits from an interior of a heat exchanger vessel, wherein the improvement comprises:

utilizing a chemical cleaning additive having a low temperature pH which is passive to ferritic materials for reacting with silicon compounds of the scale, sludge or deposits in said high velocity jet of water to loosen or dislodge the scale, sludge or deposits.

14. The method of claim 13, wherein said chemical cleaning additive consists of a carrier agent or an intercalation agent.

15. A method for performing a chemical cleaning operation utilizing a high velocity jet of water to loosen or dislodge scale, sludge or deposits from an interior of a heat exchanger vessel, wherein the improvement comprises:

utilizing a chemical cleaning additive consisting of a carrier agent and an intercalation agent for reacting with silicon compounds of the scale, sludge or deposits in said high velocity jet of water to loosen or dislodge the scale, sludge or deposits.

16. The method of claim 14, wherein said carrier agent is selected from the group consisting of lower alkyl amines, lower alkanol amines, and lower alkoxyalkyl amines.

17. The method of claim 14, wherein said intercalation agent comprises a cyclic diimine.

18. The method of claim 15, wherein said carrier agent is selected from the groups consisting of lower alkyl amines, lower alkanol amines, and lower alkoxyalkyl amines.

19. The method of claim 15, wherein said intercalation agent comprises a cyclic diimine.

20. The method of claim 14, wherein said carrier agent is selected from the group consisting of dimethylamine, ethylamine, 1,2-diaminoethane, diaminopropane, ethanolamine, 2-methyl-2-amino-1-propanol, 5-aminopentanol, and 3-methoxypropylamine.

21. The method of claim 14, wherein said intercalation agent is selected from the group consisting of 1,10-phenanthroline, 2,9-dimethyl-1,10-phenanthroline, 4,7-dimethyl-1,10-phenanthroline, 2,2'-bipyridine, 4,4'-bipyridine, and terpyridine.

22. The method of claim 15, wherein said carrier agent is selected from the group consisting of dimethylamine, ethylamine, 1,2-diaminoethane, diaminopropane, ethanolamine, 2-methyl-2-amino-1-propanol, 5-aminopentanol and 3-methoxypropylamine.

23. The method of claim 15, wherein said intercalation agent is selected from the group consisting of 1,10-phenanthroline, 2,9-dimethyl-1,10-phenanthroline, 4,7-dimethyl-1,10-p phenanthroline, 2,2'-bipyridine, 4,4'-bipyridine, and terpyridine.

24. The method of claim 13, including the additional step of utilizing a chelate in addition to the aqueous chemical cleaning additive to react with the silicon compounds.

25. The method of claim 13, including the additional step of utilizing ethylenediamine tetraacetic acid (EDTA) in addition to the chemical cleaning additive to react with the silicon compounds.

26. A method for performing a chemical cleaning operation to loosen or dislodge scale, sludge, or deposits from an interior of a heat exchanger vessel, which comprises the steps of:

introducing an aqueous chemical cleaning solution having a low temperature pH which is passive to ferritic materials for reacting with silicon compounds of the scale, sludge or deposits into said interior of said heat exchanger vessel;

allowing said aqueous chemical cleaning solution to soak within said interior of said heat exchanger vessel; and employing a high velocity jet of water to loosen or dislodge at least a portion of said scale, sludge or deposits.

27. A method for performing a chemical cleaning operation to loosen or dislodge scale, sludge, or deposits from an interior of a heat exchanger vessel, which comprises the steps of:

introducing an aqueous chemical cleaning solution consisting of a carrier agent and an intercalcation agent for reacting with silicon compounds of the scale, sludge or deposits into said interior of said heat exchanger vessel;

allowing said aqueous chemical cleaning solution to soak within said interior of said heat exchanger vessel; and employing a high velocity jet of water to loosen or dislodge at least a portion of said scale, sludge or deposits.

28. The method of claim 26, wherein said aqueous chemical cleaning solution consists of a carrier agent or an intercalation agent.

29. The method of claim 27, wherein said carrier agent is selected from the group consisting of lower alkyl amines, lower alkanol amines, and lower alkoxyalkyl amines.

30. The method of claim 27, wherein said intercalation agent consists of a cyclic diimine.

31. The method of claim 28, wherein said carrier agent is selected from the group consisting of lower alkyl amines, lower alkanol amines, and lower alkoxyalkyl amines.

32. The method of claim 28, wherein said intercalation agent consists of a cyclic diimine.

33. The method of claim 27, wherein said carrier agent is selected from the group consisting of dimethylamine, ethylamine, 1,2-diaminoethane, diaminopropane, ethanolamine, 2-methyl-2-amino-1-propanol, 5-aminopentanol, and 3-methoxypropylamine.

34. The method of claim 27, wherein said intercalation agent is selected from the group consisting of 1,10-phenanthroline, 2,9-dimethyl-1,10-phenanthroline, 4,7-dimethyl-1,10-phenanthroline, 2,2'-bipyridine, 4,4'-bipyridine, and terpyridine.

35. The method of claim 28, wherein said carrier agent is selected from the group consisting of dimethylamine, ethylamine, 1,2-diaminoethane, diaminopropane, ethanolamine, 2-methyl-2-amino-1-propanol, 5-aminopentanol, and 3-methoxypropylamine.

36. The method of claim 28, wherein said intercalation agent is selected from the group consisting of 1,10-phenanthroline, 2,9-dimethyl-1,10-phenanthroline, 4,7-dimethyl-1,10-p phenanthroline, 2,2'-bipyridine, 4,4'-bipyridine, and terpyridine.

37. The method of claim 26, including the additional step of introducing a chelate into the interior of the heat exchanger vessel.

38. The method of claim 26, including the additional step of introducing ethylenediamine tetraacetic acid (EDTA) into the interior of the heat exchanger vessel.

39. The method of claim 26, wherein said high velocity jet of water contains a chemical cleaning additive.

40. The method of claim 39, wherein said chemical cleaning additive consists of a carrier agent and an intercalation agent.

41. The method of claim 39, wherein said chemical cleaning additive consists of a carrier agent or an intercalation agent.

42. The method of claim 39, wherein said high velocity jet of water contains a chelate in addition to the additive.

43. The method of claim 39, wherein said high velocity jet of water contains ethylenediamine tetraacetic acid (EDTA) in addition to the additive.

44. The method of claim 26, wherein said heat exchanger vessel comprises a nuclear steam generator.

45. The method of claim 44, wherein said aqueous chemical cleaning solution is introduced into said nuclear steam generator during a cooldown period, following initiation of a residual heat removal (RHR) system operation.

46. The method of claim 45, wherein said aqueous chemical cleaning solution is introduced into an auxiliary feedwater flow path.

47. A method for removing sludge, scale, or deposits from an interior of a heat exchanger vessel, which comprises the steps of:

introducing an aqueous chemical cleaning solution containing a chemical cleaning agent into said interior of said heat exchanger vessel, said aqueous chemical cleaning solution comprising a cleaning agent consisting of an intercalation agent; and removing said aqueous chemical cleaning solution and at least a portion of said sludge, scale, or deposits from said interior of said heat exchanger vessel.

48. The method of claim 47, wherein said intercalation agent is selected from the group consisting of 1,10-phenanthroline, 2,9-dimethyl-1,10-phenanthroline, 4,7-dimethyl-1,10-phenanthroline, 2,2'-bipyridine, 4,4'-bipyridine, and terpyridine.

49. The method of claim 47, wherein said chemical cleaning agent is provided in a concentration less than 0.1 weight percent of said aqueous chemical cleaning agent.

50. The method of claim 47, which further comprises:

generating a series of pressurized pulses within said aqueous chemical cleaning solution after said aqueous chemical cleaning solution has been introduced into said interior of said heat exchanger vessel to create shock waves in said aqueous chemical cleaning solution.

* * * * *